X 0007480
J Gans.
Clover Huller.
Patented Mar. 12, 1833.
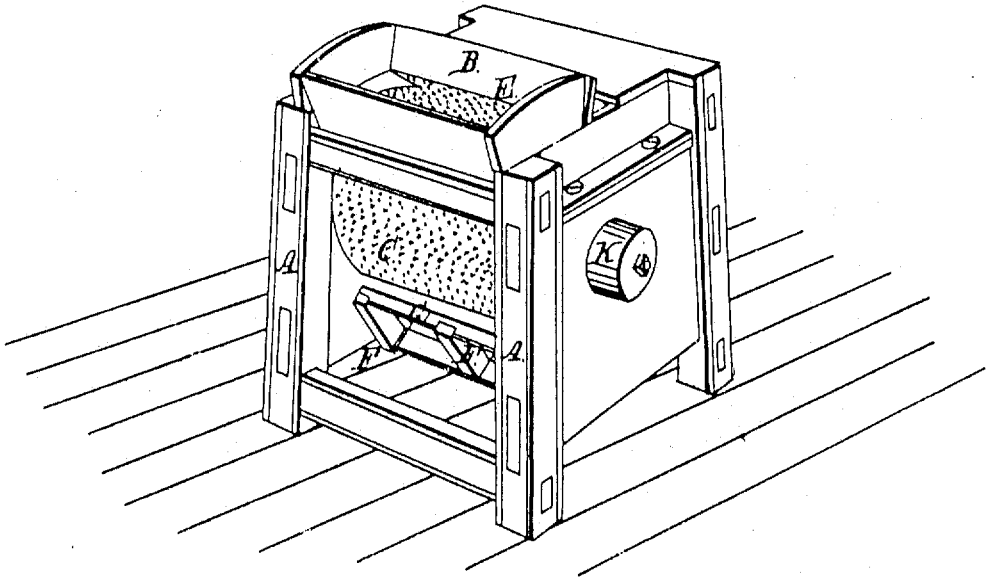
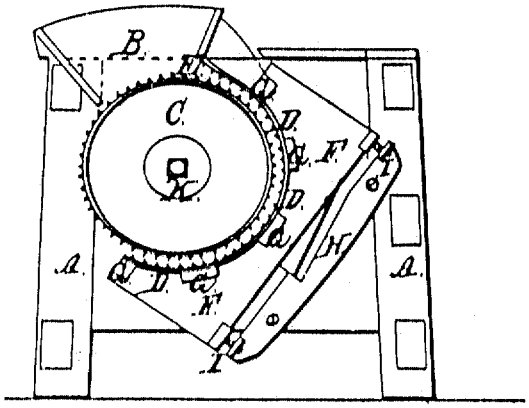
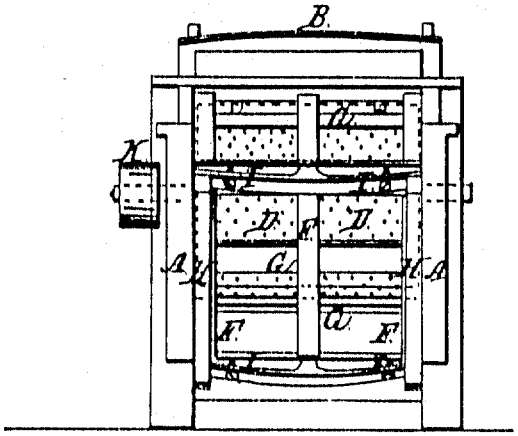
H. PETERS, PHOTO-LITHOGRAPHER, WASHINGTON, D. C.

3/12/1833 [illegible]

March 12. 1833 89

Jacob Ganz, Fayette Co Pennsylvania

Letters Patent

The Schedule referred to in these Letters Patent and making part of the same containing a description in the words of the said Jacob Ganz himself of his improvement in the machine for hulling clover seed Be it known that I Jacob Ganz of Fayette County and State of Pennsylvania have made an improvement in the machine for hulling Clover seed which is described as follows. The frame or box is made of any convenient size adapted for the machine. It is enclosed at the sides and ends like a box and covered at the top with a lid.

The rubbing Cylinder is made of wood and covered with sheet iron or any suitable material and is of any convenient length and diameter. It turns on gudgeons and bears in the frame. The sheet iron covering is punched all over so as to make projections at about 1/8th or 1/3d of an inch apart.

The Breast or bed is made of a diameter a little greater than the cylinder it extends about three fourths around the Cylinder and rests on springs placed underneath. these may be either spiral or any other springs. It is to be similarly punched as the cylinder but the projections are inward. It is placed at such a distance from the cylinder that it will turn freely but rub out the seed. The gearing is attached as attended to the axle of the cylinder and may be either a pulley with a strap or belt passing round a drum. or it may be a small cog wheel working into a large one The machine may be turned by hand or Horse power Operation. The Clover seed after having been thrashed from the straw is put into a hopper placed over the cylinder & bed. The machine being put in motion carries the seed between the cylinder and concave bed and there it is rubbed out. the seed and chaff then pass thro the holes in the breast and bed properly separated and it is cleaned in the usual way For a further illustration of my invention. I refer to the model and drawing of the same deposited in the Patent Office — What I claim as my invention, & which I wish to secure by Letters Patent in the before described machine for hulling clover seed, is the general arrangement and combination for the purposes above set forth.

In testimony whereof I have hereunto subscribed my name this 6th day of March 1832.

Witnesses
Wm. Wm. S. Elliot
Benjn. F. Perry

Jacob Gans.

(462 words)

(Patented 12 March 1832)
Dr in Port folio